Dec. 25, 1951

A. J. TORRE ET AL 2,580,052

NONLINEAR SIGNAL TRANSMISSION SYSTEM

Filed June 24, 1949

INVENTORS
ALTON J. TORRE AND
LOREN R. KIRKWOOD
BY H. L. Newton
ATTORNEY

Patented Dec. 25, 1951

2,580,052

UNITED STATES PATENT OFFICE 2,580,052

NONLINEAR SIGNAL TRANSMISSION SYSTEM

Alton J. Torre, Westmont, and Loren R. Kirkwood, Oaklyn, N. J., assignors to Radio Corporation of America, a corporation of Delaware Application June 24, 1949, Serial No. 100,988

2 Claims. (Cl. 178—44)

Figure 1:
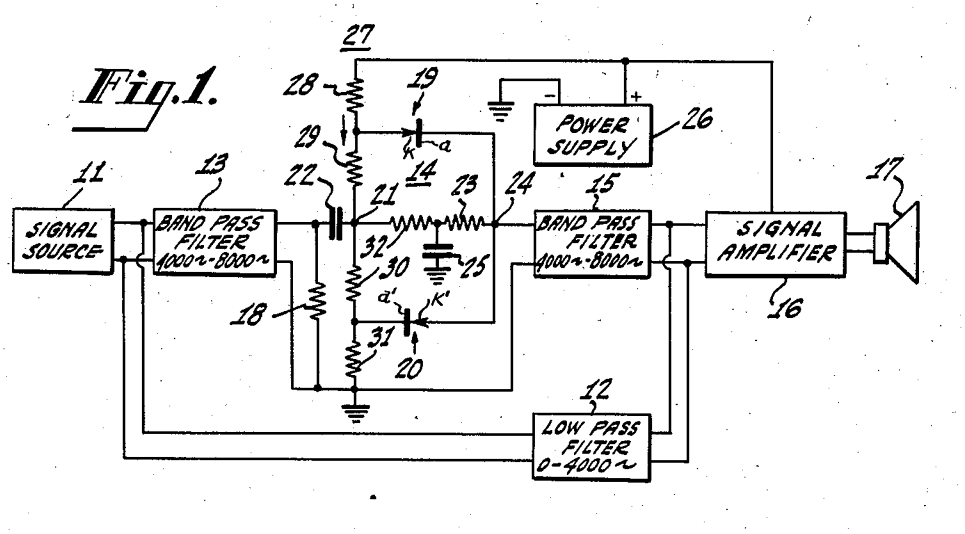

This invention relates to non-linear signal transmission circuits, and particularly to means for developing biasing voltages for certain of the components of circuits of this character which, for example, may be employed for noise reduction purposes, so as to effect operation of the signal transmission circuits in a predetermined region of non-linearity.

In audio signaling or signal transmission systems, it is desirable to suppress as much as possible any noise effects which may be present with the audio signals which are to be reproduced as sound effects. While it probably is true that there generally are noise effects present with substantially all audio signals, they are not particularly objectionable when the audio signals are present at relatively high levels. However, when the audio signal level is relatively low, the signal-to-noise ratio becomes appreciably large, so that the noise effects are objectionable. This is particularly true in the high frequency range of the audio signals. Consequently, when the audio signals are predominantly of high frequencies and are of low level, the noise effects become extremely objectionable.

In order to overcome, at least in part, these objectionable characteristics of the noise effects, numerous noise suppression circuits have been proposed in the past. Among these circuits is one covered in a copending application of Harry F. Olson, Serial No. 721,119, filed January 9, 1947, and entitled "Audio Noise Reduction System." Essentially this system separates the audio signals, together with whatever noise effects may be present therewith, into two frequency bands. The low frequency band of signals is passed without change from the signal source to an output circuit such as an audio signal amplifier of a sound reproducing apparatus. The band of relatively high frequency audio signals is passed through a non-linear signal transmission circuit for the purpose of suppressing all signals within the band having less than a predetermined amplitude. The non-linear circuit also has the characteristic of passing without substantial modification all signals within the high frequency band having greater than the predetermined amplitude. The two frequency bands of signals are then combined for impression upon the reproducing apparatus.

Essentially, the non-linear circuit consists of a pair of unilaterally conducting devices connected in parallel and in opposite polarity. In an ideal arrangement, each of the unilaterally conducting devices would have the property of changing abruptly from a non-conducting to a conducting state in response to voltages impressed thereon exceeding a predetermined threshold value. Thus any audio signal voltages, together with whatever noise effects may be present therewith, below the threshold voltage of the non-linear unilaterally conducting devices will not be reproduced in the output circuit thereof for subsequent combination with the low frequency signal voltages. Hence the noise effects are effectively suppressed at the cost, however, of concomitantly suppressing whatever signal voltages of low level may be present. Any signal voltages, together with noise effects, which exceed the threshold voltage of the non-linear circuit will be passed therethrough without substantial modification.

In systems of this character, it is customary to set the threshold value for the non-linear devices substantially at the maximum level of the noise effects. In such a case, there are substantially no noise effects transmitted to the reproducing apparatus which would render the reproduced sound objectionable.

Considering all aspects of the performance of a non-linear circuit of the character described, it has been determined that one of the most effective elements for use as the unilaterally conducting devices thereof is a germanium crystal. Such a device has the desirable attribute of changing at a relatively rapid rate from a relatively high resistance value to a relatively low resistance value in response to a minimum change in the voltage impressed thereon. However, the germanium crystal also has the property that, in order to perform in the manner described, it requires the impression thereon of a biasing voltage of a relatively small magnitude, such as a fraction of a volt. In systems such as that described in the copending Olson application referred to, the source of the biasing voltage for the germanium crystals is the small battery such as a dry cell or a plurality of such batteries. A biasing voltage source of such a character, however, is not entirely satisfactory for the reason that the voltage supplied thereby does not remain constant during the life of the battery, and furthermore, since such batteries have a somewhat limited life, there is the necessity of replacing them at recurring intervals.

Accordingly, it is an object of the present invention to provide a means for developing relatively small voltages for use in biasing the unilaterally conducting devices employed in a non-linear signal transmission circuit by deriving these relatively small voltages from the relatively high voltage power supply necessary for use in conjunction with the signal amplifying apparatus with which the non-linear circuit is to be used.

Another object of the invention is to provide a means for deriving, from a relatively high unidirectional voltage source, relatively small, equal voltages of opposite polarity for biasing a plurality of oppositely poled unilaterally conducting devices employed in a non-linear signal transmission circuit.

Still another object of the invention is to provide apparatus for deriving, from a relatively high voltage unidirectional power supply, relatively small voltages and for impressing said small voltages upon the unilaterally conducting devices employed in a non-linear signal transmission circuit in such a manner as to render the non-linear circuit independent of the input and output circuits thereof.

In accordance with the present invention, there is provided a signal transmission circuit of a non-linear character, whereby to effect amplitude discrimination of alternating voltages impressed thereon. This discrimination is effected primarily by reason of the operation of at least one, but preferably two, oppositely poled, unilaterally conducting devices coupled into a signal transmission circuit. The unilaterally conducting device has the property of effectively changing its resistance from a relatively high value to a relatively low value in response to a relatively small change in the amplitude of the voltage impressed thereon. To perform in this manner, a relatively small biasing voltage is required to be impressed upon each of the unilaterally conducting devices employed. Further, in accordance with the invention, these biasing voltages are derived from a relatively high voltage unidirectional power supply through the agency of a network comprising a relatively high resistance bleeder connected across the unidirectional voltage source and including a section having a relatively low effective resistance.

In the case where two oppositely poled, unilaterally conducting devices are employed, the two terminals of the relatively low resistance section, at which there are developed two equal, relatively low voltages of opposite polarity relative to the voltage of the intermediate point of the low resistance bleeder section, are coupled to electrodes of opposite polarity of the respective unilaterally conducting devices and a return path for unidirectional current is connected between the other electrodes of these devices and the intermediate point of the low resistance bleeder section. Additionally the bleeder may include another resistive section to isolate the non-linear signal transmission circuit from the grounded, oppositely poled terminal of the high voltage unirectional power supply. A resistor network in accordance with the invention provides a relatively simple and highly efficient means for deriving the necessary biasing voltage for the unilaterally conducting devices whereby to minimize the current drain placed upon the high voltage, unidirectional power supply. It also provides an arrangement which is relatively permanent and thus is a marked improvement over an arrangement wherein low voltage batteries are employed for producing the biasing voltages. The non-linear amplitude discriminating circuit, therefore, is capable of operating continuously at optimum effectiveness by reason of the fact that the biasing voltages are not subject to variation as in the case of batteries of the dry cell type where the voltage decreases as the batteries age.

Further, in connection with another feature of the present invention, there is provided circuit means including a capacitor coupled between the signal source and the intermediate point of the low resistance bleeder section, whereby to isolate the signal input circuit impedance device from the biasing voltage developing network. Also, a point on the return path for unidirectional current is bypassed to ground by means of a capacitor so that, for the alternating voltages, the output circuit of the non-linear signal transmission circuit may be made independent of the biasing voltage developing network.

Figure 2:
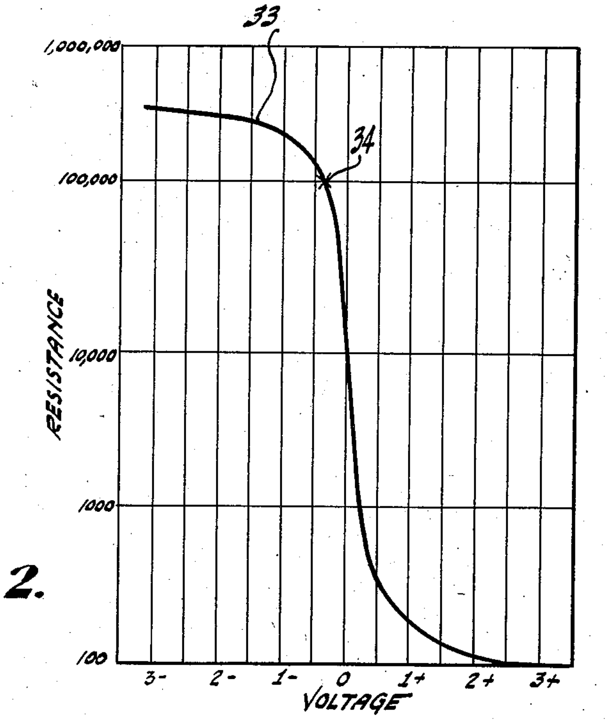

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a circuit diagram of a signal amplifying and reproducing system embodying the present invention; and Figure 2 is a curve showing the characteristics of the unilaterally conducting device preferred for use in the illustrated embodiment of the invention.

Having reference now to Figure 1 particularly, there is shown a signal source 11 which, for example, may be any source of audio signals such as a phonograph pickup device, a signal detector of a radio receiver, the pickup device of a film sound track, and the like. The output circuit of the signal source is coupled to a low pass filter 12 which, for example, may transmit all signal voltages having frequencies from 0 to 4,000 cycles per second. The output circuit of the signal source 11 also is coupled to a band pass filter 13 which, for example, may be designed to pass all signal voltages having frequencies within the range of 4,000 to 8,000 cycles per second. The output circuit of the band pass filter is coupled to a non-linear amplitude discriminating signal transmission circuit 14, the output circuit of which in turn is coupled to a second band pass filter 15, which may be similar in design to the filter 13. The output circuits of the low pass filter 12 and the band pass filter 15 are combined and coupled to the input circuit of a signal amplifier 16, to the output circuit of which may be coupled a loud speaker 17 or other sound reproducing apparatus.

The apparatus described up to this point includes in general all of the essential components of a noise suppression system of the type disclosed in the copending Olson application referred to previously. In effect, its operation is as follows: All signal voltages, together with whatever noise effects may be present therewith having frequencies up to 4,000 cycles per second, are transmitted without substantial modification from the signal source 11 through the low pass filter 12 to the signal amplifier 16 for ultimate reproduction by the loud speaker 17. All voltages including signal and noise effects having frequencies within the range of 4,000 to 8,000 cycles per second are selected by the band pass filter 13 and transmitted to the non-linear signal transmission circuit 14.

This circuit includes non-linear, unilaterally conducting devices connected and biased appropriately in a manner to be described so that, for all voltages below a predetermined threshold amplitude impressed thereon, there are substantially no signal and/or noise voltages reproduced in the output circuit for impression upon the band pass filter 15. Consequently, only those signal voltages below a frequency of 4,000 cycles per second are amplified and reproduced by the loud speaker 17. However, any signal and/or noise voltages appearing in the output circuit of the band pass filter 13 having amplitudes greater than the threshold amplitude are passed without substantial modification by the non-linear amplitude discriminating circuit 14 and are impressed upon the band pass filter 15. The purpose of this latter filter is to effectively remove any harmonic distortion which may be introduced by reason of the operation of the non-linear circuit 14. The relatively high frequency voltages developed at the output circuit of the band pass filter 15 are combined with the relatively low frequency signal voltages derived from the low pass filter 12 and are impressed upon the signal amplifier for reproduction by the loud speaker 17.

Considering now more in detail the amplitude discriminating circuit embodying the present invention, a resistor 18 is provided as the input circuit load impedance device for the non-linear circuit 14 and is coupled to the band pass filter 13 as shown. It will be demonstrated subsequently that the value of the resistor 18, or of any other input load impedance device with which the amplitude discriminating circuit may be provided, may be given any desired value, by reason of the fact that the non-linear circuit and its biasing facilities in accordance with the present invention, may be entirely isolated for unidirectional currents from both the input and output circuits thereof. Essentially, the non-linear amplitude discriminating circuit in accordance with this invention comprises a pair of unilaterally conducting devices 19 and 20, both of which are connected effectively in shunt with one another and to an input terminal 21. These devices are arranged in opposite polarity as shown, and the input terminal 21 is coupled by means of a capacitor 22 to the input load resistor 18. The non-linear circuit 14 also is provided with an output load resistor 23, coupled between an output terminal 24 and ground by means of a capacitor 25 having a low impedance for signal currents. The output terminal 24 of the non-linear circuit is coupled to the input circuit of the band pass filter 15.

In order to provide the necessary relatively small biasing voltages for the unilaterally conducting devices 19 and 21, there is provided in accordance with the present invention a network for deriving these voltages from a unidirectional power supply 26 of sufficiently high voltage to furnish space current for the signal amplifier 16 and other apparatus of a similar character. As conventionally employed, the negative terminal of the power supply is grounded. The positive terminal of the power supply is connected to one terminal of a relatively high resistance bleeder 27, the other terminal of which is grounded. The bleeder 27 comprises the series connection of a plurality of resistors including a resistor 28 having a relatively high value, two equal resistors 29 and 30 forming a relatively low resistance section, and a resistor 31 of substantially any desired value. Preferably, the value of resistor 31 should be approximately ten times the value of the input load resistor 18. The input terminal 21 of the non-linear circuit 14 is connected to the junction point between the relatively low, equal valued resistors 29 and 30, which point also is connected by a resistor 32 to the junction point between the output load resistor 23 and the capacitor 25.

Before considering in any greater detail the non-linear amplitude discriminating circuit 14, it is considered that a better understanding of the present invention may be had by first considering the essential properties of the unilaterally conducting devices 19 and 20. It has been determined that, for employment in a circuit of the present character, germanium crystals provide the most effective devices for accomplishing the desired results. By reference to Figure 2, it may be seen that germanium crystals are capable of operating in a very efficient manner. This figure illustrates the non-linear conducting property of a germanium crystal. The curve 33 illustrates the change in resistance of such a crystal in response to changes in the voltage applied thereto. In this figure, the applied voltages are plotted as abscissas and the resistances are plotted as ordinates. It will be noted that, when no voltage is impressed upon the crystal, it has a resistance value of approximately 10,000 ohms. Also it will be observed that, if a relatively small negative biasing voltage of, say, approximately 0.3 volt is impressed upon the crystal, it has a resistance of approximately 100,000 ohms, as indicated by the point 34. Also, in response to a relatively small voltage of positive polarity, the resistance of the crystal becomes quite small, such as of the order of 100 ohms. Therefore, if such a crystal be initially biased by the impression thereon of a negative voltage having a magnitude of something less than 1 volt, and the impressed voltage varied to a relatively small degree, say, to any voltage of positive polarity, the resistance of the crystal will change from a value of the order of 100,000 ohms to one of the order of 100 ohms. For all practical purposes then, in response to voltages having magnitudes less than a predetermined one, the crystal is virtually non-conducting and, in response to any voltage having a greater than the predetermined magnitude, the crystal is highly conducting. Consequently, it is well suited for use in an amplitude discriminating circuit of the character disclosed herein. However, in order to be of optimum utility, it is necessary to bias such a crystal by means of a relatively small magnitude voltage of negative polarity.

The derivation of such unidirectional biasing voltages of proper polarity, for impression upon the unilaterally conducting devices 19 and 20 of Figure 1, is one of the functions of the bleeder 27. In developing such voltages, it also is desirable to minimize the current drain upon the power supply 26. Consequently, to effect both of these results, the bleeder must of necessity have an overall resistance which is relatively high to minimize current drain upon the power supply and yet, at the same time, must include a relatively low resistance section in order to develop the relatively small voltages required for biasing purposes. The first requirement of such a bleeder is met principally by means of the relatively high valued resistor 28. The second requirement is met by the connection in series with the resistor 28 of the relatively low resistors 29 and 30. One of the desirable attributes of germanium crystals for use in an amplitude discriminating circuit of the character employed in the present system is that they may be procured in substantially perfectly matched pairs. As a consequence, the characteristics of each of the devices 19 and 20 are substantially identical, so that equal fixed resistors 29 and 30 may be employed to develop substantially equal biasing voltages for the unilaterally conducting devices.

In order to suitably bias each of the unilaterally conducting devices 19 and 20 so that, in the absence of voltages of greater than a predetermined magnitude, they will exhibit a relatively high resistance, it is necessary that the cathodes thereof be of positive polarity with respect to the associated anodes. Specifically, in the device 19 the cathode *k* should be of positive polarity with respect to the associated anode *a*. Similarly, the cathode *k'* of the device 20 should be of positive polarity with respect to its associated anode *a'*. Considering that the current flow from the positive terminal of the power supply 26 through the bleeder 27 is in the direction of the arrow, it will be seen that the upper terminal of the resistor 29 is of positive polarity with respect to the lower terminal thereof. This latter terminal is conductively connected by means of resistors 23 and 32, serving as a common return path for both of the unilaterally conducting devices, to the anode *a* of the device 19, while the cathode *k* thereof is connected to the upper terminal of the resistor 29. Therefore, in view of the relative polarities of the two terminals of the resistor 29, it is seen that the device 19 is properly biased. Also the current flow through the bleeder 27 traverses resistor 30 in such a direction to make the upper terminal thereof positive with respect to the lower terminal. The lower terminal is connected, as shown, to the anode *a'* of the device 20 and the upper terminal of the resistor 30 is connected through the common return path including resistors 23 and 32 to the cathode *k'*. Here again it is seen that, in view of the relative polarities of the terminals of resistor 30, the device 20 is suitably biased to exhibit a relatively high resistance.

Therefore, when the signal and/or noise voltages developed across the input load resistor 18, for the band of frequencies passed by the filter 13, are less in magnitude than the biasing voltages impressed upon the unilaterally conducting devices 19 and 20 in the manner described, the amplitude discriminating circuit 14 is virtually non-conducting, so that none of the alternating voltages appearing in the output circuit of the band pass filter 13 are transmitted to the input circuit of the band pass filter 15. Consequently, there is no reproduction of these voltages by the amplifier 16 and loud speaker 17. However, when the alternating current voltages developed in the resistor 18 exceed in magnitude the biasing voltages of the unilaterally conducting devices 19 and 20, the circuit 14 substantially instantaneously becomes highly conducting, so that there is substantially unmodified reproduction of these voltages by the amplifier 16 and loud speaker 17.

Inasmuch as the non-linear amplitude discriminating circuit 14 functions essentially as a clipping device, there are necessarily produced, as a result thereof, distortions of the alternating current voltages appearing in the input load resistor 23. These distortions are produced by reason of the development of harmonics of the fundamental voltages impressed upon the input circuit load resistor 18. By reason of the connection of the unilaterally conducting devices 19 and 20 in opposed polarity, the even harmonics are effectively balanced out and do not appear in the output load resistor 23. However, the odd harmonics are developed in this resistor. Consequently, it is necessary to include, between the output terminal 24 of the amplitude discriminating circuit and the signal amplifier 16, the additional band pass filter 15. This filter serves to effectively eliminate substantially all odd harmonic distortion.

It may be seen, therefore, that the present invention provides an efficiently operating non-linear amplitude discriminating circuit for use in effectively suppressing all voltages impressed thereon having a magnitude which is less than a predetermined magnitude, and at the same time serves to transmit to the reproducing apparatus, substantially unmodified, all impressed voltages having magnitudes greater than the predetermined one. The amplitude discriminating circuit, by including devices such as germanium crystals as the non-linear unilaterally conducting devices, preferably should be provided with suitable facilities for impressing biasing voltages of relatively small magnitude upon the crystals. The facilities, in accordance with the present invention, for providing these relatively small biasing voltages are of such a character that they may be derived from a relatively high voltage unidirectional power supply. Furthermore, the voltage developing facilities in accordance with this invention are of such a character that the unidirectional currents thereof may be effectively isolated from both the input and output circuits of the non-linear circuit. Therefore, the biasing facilities function entirely independently of the input and output circuits of the amplitude discriminating circuit. Such a circuit, consequently, may be employed with input and output circuits of any desired character without affecting the input and output circuits or the facilities for developing the biasing voltages. Furthermore, the biasing voltage developing facilities, in accordance with this invention, are highly efficient in their operation and, therefore, do not place any substantial additional drain upon the power supply.

Without in any way limiting or restricting the present invention, the following table of values of the essential components of the illustrated embodiment of the invention is given by way of example:

| | |
|---|---|
| Resistor 18 | 500 ohms |
| Crystals 19, 20 | Sylvania 1N35 |
| Capacitors 22, 25 | 0.5 microfarad |
| Resistor 23 | 10,000 ohms |
| Power supply 26 | 250 volts |
| Resistor 28 | 820,000 ohms |
| Resistors 29, 30 | 1,000 ohms |
| Resistor 31 | 4,700 ohms |
| Resistor 32 | 100,000 ohms |

From this table it may be seen that the additional drain placed upon the power supply 26 by the inclusion of the disclosed network for developing the relatively small biasing voltages for the unilaterally conducting devices 19 and 20 is comparatively small, and is of the order of 0.3 milliampere. Also it may be seen that this current, in traversing the relatively low valued resistors 29 and 30, develops a biasing voltage of approximately 0.3 volt. Furthermore, it will be observed that the signal voltages are impressed upon a circuit including effectively the series connection of one of the equal resistors 29 or 30, the corresponding unilaterally conducting device 19 or 20, and the output load resistor 23. In view of the fact that, when the devices 19 and 20 are in a conducting state, the resistance thereof is negligible, it indicates that the signal voltages are impressed upon a circuit including essentially the resistors 29 or 30 and the resistor 23. Since this latter resistor, in accordance with the foregoing table, is approximately ten times the value of either of the resistors 29 and 30, it may be seen that at least 90 per cent of the signal voltages are developed across the output resistor 23. Accordingly, the amplitude discriminating circuit, including the resistive biasing network therefor, operates in a highly efficient manner.

It will be appreciated that the present invention may be embodied in forms other than that specifically described herein for illustrative purposes. It is to be understood, therefore, that the presently disclosed embodiment of the invention is not to be considered necessarily as limiting the scope of the invention. Accordingly, the scope of the invention is to be determined by reference to the appended claims.

What is claimed is:

1. In a signaling system including a source of alternating voltages of variable amplitude, a band pass filter circuit having an input circuit connected to said source and an output circuit, an amplitude discriminating circuit comprising a pair of shunt-connected, oppositely poled nonlinear unilaterally conducting devices, each having the property of being substantially non-conducting when energized by a voltage of predetermined polarity and relatively small magnitude and highly conducting when energized by voltages of opposite polarity, a source of unidirectional voltage of relatively large magnitude, a network for deriving from said unidirectional voltage source a voltage of said predetermined polarity and relatively small magnitude, said network comprising a relatively high resistance bleeder connected across said unidirectional voltage source, said bleeder including a relatively low resistance section comprising two substantially equal serially connected resistors, connected to said unilaterally conducting device for impressing said relatively small voltages upon said devices, an input load impedance device connected to said output circuit, a capacitor connected between said input load impedance device and the junction of said low resistance resistors and isolating said impedance device from unidirectional currents of said network, and a return path for unidirectional network current including an output load impedance device of a magnitude several times said input impedance, said output load impedance including a pair of serially connected resistors connected between the junction of said low resistance resistors and the junction of said pair of unilateral conducting devices, and a capacitor connected between the junction of said output load impedance resistors and one terminal of said source of unidirectional voltage, and a band pass filter circuit having a characteristic substantially identical to said first band pass filter circuit and having an input circuit connected to said unilateral conducting device junction and said one terminal of said source of unidirectional voltage and an output circuit.

2. In a signaling system including a source of audio signal voltages of variable amplitude, an input load resistor coupled to said source, an amplitude discriminating circuit comprising a pair of shunt-connected, oppositely poled nonlinear unilaterally conducting germanium crystals, each having the property of being substantially non-conducting when energized by a negative voltage of relatively small magnitude and highly conducting when energized by negative voltages of smaller magnitudes or by positive voltages, circuit means including a capacitor connecting said input load resistor to said amplitude discriminating system, a source of unidirectional voltage of relatively large magnitude, a network for deriving from said unidirectional voltage source a negative voltage of said relatively small magnitude, said network including a relatively high resistance bleeder connected across said unidirectional source, said bleeder including a relatively low resistance section comprising two serially connected equal resistors, said bleeder also including two resistors having relatively high values of resistance connecting the terminals of said low resistance section to the terminals of said unidirectional voltage source, substantially non-resistive circuit means connecting the terminals of said low resistance section to oppositely poled electrodes of said respective devices, a return path for unidirectional current including an additional resistor of relatively high value connected between the other electrodes of said devices and the junction point between said two equal resistors, an output load resistor also included in said return path and having a relatively high resistance as compared to that of said input load resistor, and a capacitor connecting said output load resistor to ground for audio signal voltages.

ALTON J. TORRE.
LOREN R. KIRKWOOD.

REFERENCES CITED

The following references are of record in the file of this patent:

UNITED STATES PATENTS

| Number | Name | Date |
|---|---|---|
| 2,171,671 | Percival | Sept. 5, 1939 |
| 2,342,238 | Barney | Feb. 22, 1944 |
| 2,423,263 | Sprague | July 1, 1947 |

OTHER REFERENCES

Article: "Audio Noise Reduction Circuits," by H. F. Olson, published in December 1947 Electronics, pp. 118–122.